March 20, 1934.  D. C. SHELTON  1,951,776
SCALP TREATING APPARATUS
Filed Nov. 21, 1931   2 Sheets-Sheet 2
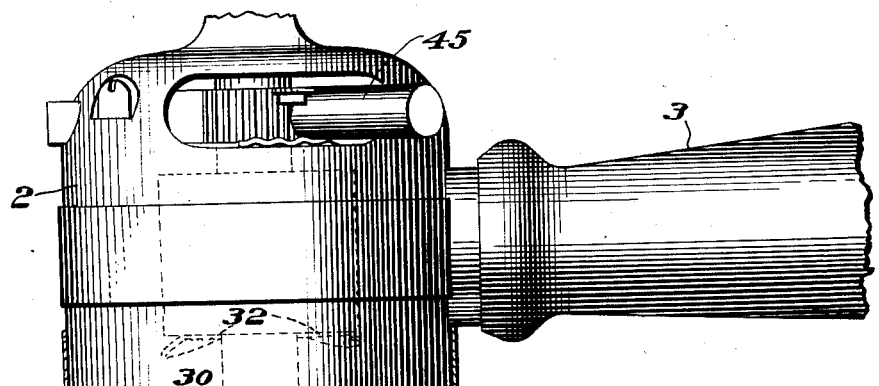
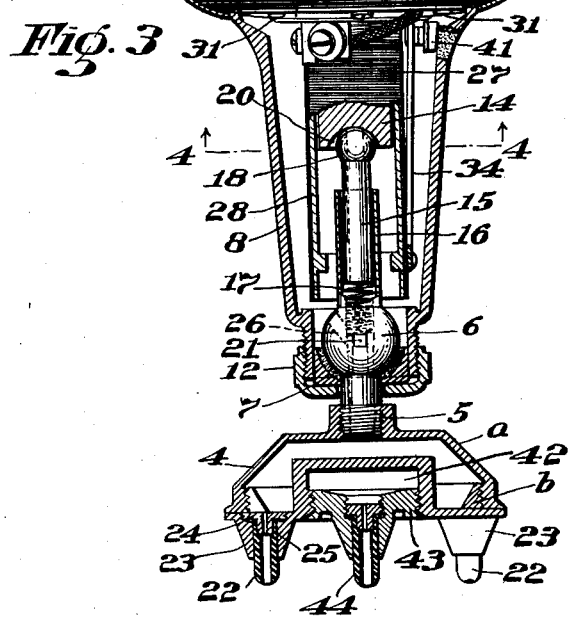
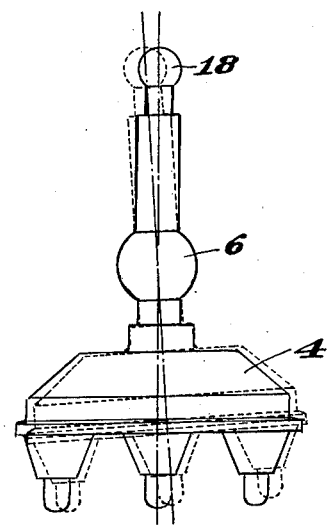
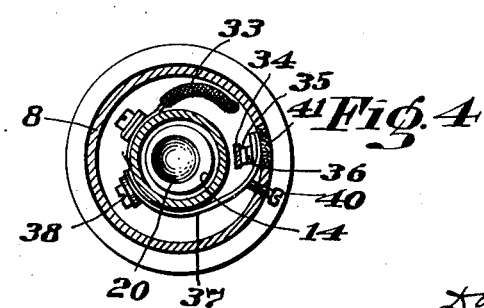
INVENTOR
Donald C. Shelton,
BY
his ATTORNEY.

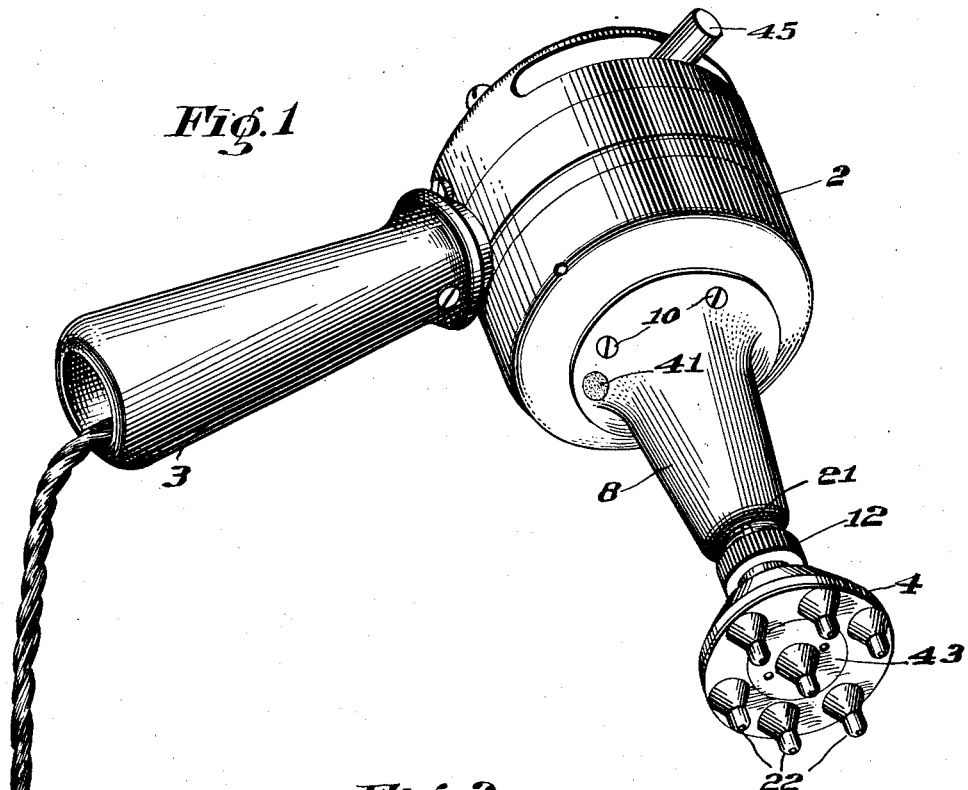
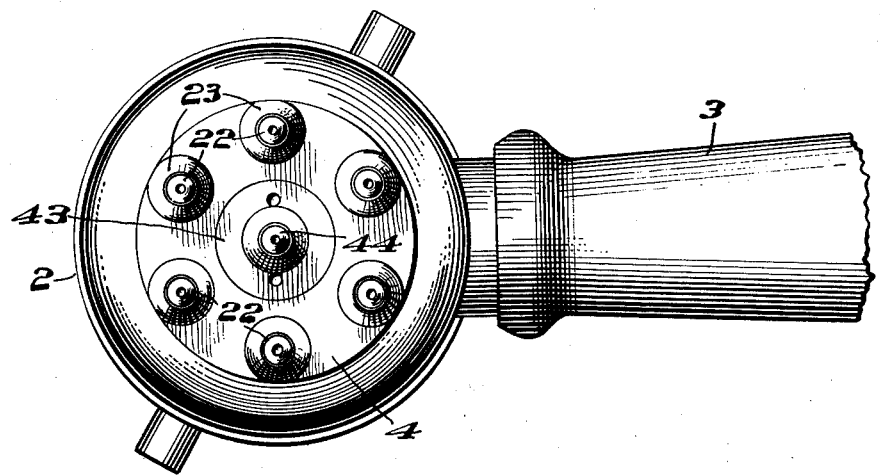

Patented Mar. 20, 1934

1,951,776

UNITED STATES PATENT OFFICE 1,951,776

SCALP TREATING APPARATUS

Donald C. Shelton, Denver, Colo.

Application November 21, 1931, Serial No. 576,470

5 Claims. (Cl. 128—65)

This invention relates to apparatus designed especially for massaging the scalp, although applicable also to other uses.

The invention aims to devise an exceptionally agreeable apparatus for this purpose, and to provide for the convenient application to the scalp of mild heat and oil or other liquids or medicaments when desired in connection with the massaging operation.

The nature of the invention will be readily understood from the following description when read in connection with the accompanying drawings, and the novel features will be particularly pointed out in the appended claims.

In the drawings,

Figure 1 is a perspective view of an apparatus constructed in accordance with this invention;

Fig. 2 is an end view of the apparatus shown in Fig. 1;

Fig. 3 is a side view, partly in section, of the apparatus;

Fig. 4 is a sectional view approximately on the line 4—4, Fig. 3; and

Fig. 5 is a diagrammatic view illustrating the manner in which the vibratory movement is produced.

The apparatus shown comprises an electric motor, the casing for which is indicated at 2, this motor being of any suitable or convenient type, although one in which the speed can be adjusted is preferred. Projecting from one side of the casing is a handle 3 by means of which the apparatus may be held in the hand and manipulated. The apparatus also includes a vibratory head 4, preferably hollow, and removably secured on the end of a shaft 5. The shaft is provided with an approximately spherical enlargement 6 which is supported in a concave socket formed in a bearing block 7. This block is mounted in the outer end of a tubular projection 8 which is removably secured to one end of the motor casing 2 by means of screws, two of which are shown at 10, Fig. 1. A cap screw 12 threaded on to the end of this projection 8 holds the bearing member 7 in place.

This arrangement supports the hollow head 4 for vibration or oscillation about the center of the spherical enlargement 6.

In order to produce the desired vibratory movement of the head 4, connections are provided between the head and the shaft 14 driven by the motor. These connections comprise a short shaft 15 which telescopes within a sleeve 16 formed integral with, or otherwise secured to, the spherical member 6, a spring 17 housed within the sleeve 16 tending constantly to force the two members 6 and 15 apart. The shaft 15 is provided with a ball shaped upper end 18 which fits in a socket 20 formed eccentrically in the end of the motor shaft 14. Consequently, as the shaft revolves and the socket 20 rotates about the axis of the shaft, it carries the upper ball end 18 around in a circular orbit having a relatively short diameter, and this movement is transmitted through the connections above described to the head 14, thus giving this head a rotary vibratory movement about the center of the bearing member 6. The nature of this movement will be clear from an inspection of Fig. 5.

In order to prevent the head 4 from revolving about the axis of the shaft 5, a pin 21 is secured in the member 6 and extends therethrough from one side to the other, the opposite ends of this pin being located in slots cut in the threaded end portion of the tubular extension 8. This pin also forms a convenient seat for the lower end of the spring 17.

Both shafts 5 and 15 are drilled axially for their entire length, this arrangement providing a convenient means for introducing lubricant to the bearing surfaces of the operating connections between the vibratory head 4 and the shaft 14.

It frequently is desirable in connection with the massaging operation to apply a moderate degree of heat to the scalp. For this purpose provision is made in this apparatus for blowing warm air upon the scalp during the massaging operation. The head 4 is made hollow and it also is provided with a series of tubular nipples 22 preferably made of rubber or some other yielding resilient material. Each of these nipples is positioned in a conical projection 23 formed integral with the head 4, and is provided at its base with an outwardly projecting flange which is positioned in a socket formed in the inner portion of its respective projection 23. A plug 24 is screw threaded into the socket and clamps the flange of the nipple securely in place, this plug preferably also having a tubular tip 25 to extend into the nipple.

As above stated, the shaft 5 is drilled axially, or, in other words, is hollow, and a hole 26, Fig. 3, is drilled through the member 6 at an angle into the bore of the shaft 5 so that free communication is provided between the interior of the head 4 and the chamber in the tubular extension 8. In this chamber is an electric heater 27 which may consist simply of a coil of resistance wire wound on an insulating sleeve that is supported on the metal sleeve 28, the latter sleeve having a flange 30 which is screwed to the end of the motor casing. Holes 31 are formed through the end of the casing and provide free communication between the interior of the motor casing and the chamber in the extension 8. In some motors a sufficient air pressure is set up simply by the rotation of the armature to force air through the openings 31, around the heater 27, through the passages in the parts 5 and 6 into the hollow head 4 and through the nipples 22, the air being warmed by the heater 27. In other types of motors it may be necessary to provide fan blades on the end of the armature or on the motor shaft, as indicated in dotted lines at 32, Fig. 3, in order to produce the desired air pressure.

This arrangement provides a very convenient means for warming the scalp during the massaging operation. The temperature of the heater also can be controlled automatically by a thermostatic switch, such, for example, as that shown in Figs. 3 and 4. This switch is included in the circuit for the heater 27, one supply conductor 33 running to one terminal of the heater, while the other terminal is connected to the lower end of a bi-metallic or thermostatic strip 34 carrying a contact 35 at its upper end to engage a similar contact 36, Fig. 4, supported in a relatively stationary position by a conducting strip 37 which, in turn, is supported by the screw 38 to which the other supply conductor is connected. As the heater warms up, the bi-metallic strip 34 warps, bending toward the heater and interrupting the engagement of its contact 35 with the stationary contact 37. The temperature at which this interruption of the flow of current through the heater will occur may be varied by turning in or out an adjusting screw 40, Fig. 4, so as to change the amount of movement which the contact 35 must make before it interrupts the heater circuit. An insulating plug 41 is set into the extension 8 at a point where the supporting strip 37 might come in contact with it.

In connection with the massaging operation it is also desirable at times to apply oil or some medicament to the scalp. This result may conveniently be accomplished by providing a reservoir 42, Fig. 3, in the hollow head 4, and closing this reservoir normally by a screw threaded plug 43 which carries a nipple 44 like the nipples 22. The plug is provided with holes to receive a spanner wrench. Usually the apparatus will be used in a vertical position, and consequently the oil or other liquid held in the reservoir 42 will feed slowly through the tubular nipple 44 and be supplied to the scalp at approximately the desired rate. Since the plug 43 is readily removable, it is a simple matter to fill the reservoir 42 whenever desired.

In the particular motor shown the speed may be varied by adjusting the arm 45.

The invention thus provides a scalp treating apparatus which can be manufactured economically, is very convenient to use, and gives much of the variety in scalp treatments which is desirable.

While I have herein shown and described a preferred embodiment of my invention, it will be understood that the invention may be embodied in other forms without departing from the spirit and scope thereof.

Having thus described my invention, what I desire to claim as new is:

1. In an apparatus of the character described, the combination of a hollow vibratory head, a motor operatively connected with said head to vibrate it, said head having a plurality of tubular nipples extending therefrom, vanes driven by said motor for blowing air through said head and said nipples, a casing enclosing said vanes and provided with inlets for said air, and means for heating the air before it is discharged from the nipples.

2. In a scalp treating apparatus, the combination of an electric motor including a casing, a tubular casing extension projecting from one side of said motor casing and surrounding the motor shaft, one of said casing members being constructed to admit air, a hollow vibratory head mounted on one end of said extension and having air outlets in the wall thereof toward the surface to be treated, means driven by said motor for forcing air through said extension and said head, an electric heater in said extension, said head and its connections with said extension being constructed to permit a circulation of air warmed by said heater through said head, and connections between said shaft and said head for vibrating said head.

3. In an apparatus of the character described, the combination of a hollow vibratory head, a motor operatively connected with said head to vibrate it, vanes driven by said motor for blowing air through said head, a casing enclosing said vanes and provided with an air inlet, said head having a plurality of nipples extending therefrom and being provided with air outlets directed toward the surface to be treated, and means for heating the air before it is discharged from said head.

4. In a scalp treating apparatus, the combination of an electric motor including a casing, a tubular extension projecting from one side of said casing and surrounding the motor shaft, a vibratory head mounted on one end of said extension to oscillate and having parts to engage the scalp, connections between said head and said shaft for causing the rotary motion of the shaft to vibrate the head, means for conducting air from a point within said casing through said head toward the scalp, vanes in said casing revolving with the motor shaft for blowing air through said conducting means and said head, said apparatus having inlets for said air, and means within said casing for heating the air so discharged from said head.

5. In a scalp treating apparatus, the combination of a hollow vibratory head, a motor operatively connected with said head to vibrate it, an oil reservoir in said head, said head having a plurality of flexible nipples extending therefrom, means for conducting oil from said reservoir through one of said nipples, means driven by said motor for blowing heated air through said head, said apparatus having one or more inlet openings for said air, and means in said apparatus for heating the air, said head having openings through which said heated air is discharged and directed against the scalp being treated.

DONALD C. SHELTON.